US012565400B2

(12) United States Patent
Kemppainen

(10) Patent No.: US 12,565,400 B2
(45) Date of Patent: Mar. 3, 2026

(54) CENTRAL ELEVATOR MANAGEMENT SYSTEM

(71) Applicant: KONE Corporation, Helsinki (FI)

(72) Inventor: Mika Kemppainen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1184 days.

(21) Appl. No.: 17/495,235

(22) Filed: Oct. 6, 2021

(65) Prior Publication Data

US 2022/0144584 A1 May 12, 2022

(30) Foreign Application Priority Data

Nov. 10, 2020 (EP) .................................... 20206584

(51) Int. Cl.
*B66B 1/28* (2006.01)
*B66B 1/34* (2006.01)

(52) U.S. Cl.
CPC .............. *B66B 1/3453* (2013.01); *B66B 1/28* (2013.01)

(58) Field of Classification Search
CPC .... B66B 1/3453; B66B 1/3407; B66B 1/3415
See application file for complete search history.

(56) References Cited

U.S. PATENT DOCUMENTS 5,387,769 A * 2/1995 Kupersmith .......... B66B 1/3415 370/461
7,855,635 B2 * 12/2010 Cohn .................. G08B 25/004 370/257
8,646,579 B2 * 2/2014 Schuster .............. B66B 1/3415 187/247
2009/0049441 A1 2/2009 Mii et al.
2012/0279807 A1 * 11/2012 Finschi ................ B66B 1/2466 187/384
2016/0259341 A1 * 9/2016 High ...................... G06T 7/593
2017/0174470 A1 * 6/2017 Salmikuukka ........ B66B 1/3415

FOREIGN PATENT DOCUMENTS

EP 3 336 029 A1 6/2018
EP 3 605 321 A1 2/2020
EP 3 632 829 A1 4/2020

* cited by examiner

*Primary Examiner* — Rina I Duda
(74) *Attorney, Agent, or Firm* — Birch, Stewart, Kolasch & Birch, LLP

(57) ABSTRACT

According to an aspect, there is provided a central elevator management system comprising an ethernet bus, a plurality of elevator system nodes communicatively connected to the ethernet bus and an elevator control unit communicatively connected to the ethernet bus and configured to communicate with the plurality of elevator system nodes via the ethernet bus. The elevator control unit is configured execute a configuration manager providing a management interface for a configuration entity, wherein the configuration manager is configured to receive a configuration update associated with at least one elevator system node from the configuration entity; and transmit configuration data to the at least one elevator system node based on the configuration update.

14 Claims, 5 Drawing Sheets

CENTRAL ELEVATOR MANAGEMENT SYSTEM

TECHNICAL FIELD

The present application relates to the field of elevator management systems.

BACKGROUND

Traditionally, internal elevator communication systems, i.e. communication systems interconnecting elevator components (control devices, sensors, actuators etc.) of an elevator system, have been implemented with building automation networks, such as controller area networks (CAN) or local operating networks (LON). Normally, there are plurality of separate communication systems with different protocol stacks within the same elevator system. Each of these communication systems will then be connected to a central elevator control unit with an individual communication interface.

If then new elevator components and/or elevator functionalities were to be added to such a system, this would be difficult as new communication interfaces with new protocol stacks would have to be added. In current elevator systems different elevator components have their own configuration tools making configuration changes difficult.

Thus, it would be beneficial to have a solution that would alleviate at least one of these drawbacks.

SUMMARY

According to a first aspect, there is provided a central elevator management system. The system comprises an ethernet bus, a plurality of elevator system nodes communicatively connected to the ethernet bus, and an elevator control unit communicatively connected to the ethernet bus and configured to communicate with the plurality of elevator system nodes via the ethernet bus. The elevator control unit is configured execute a configuration manager providing a management interface for a configuration entity, wherein the configuration manager is configured to receive a configuration update associated with at least one elevator system node from the configuration entity, and transmit configuration data to the at least one elevator system node based on the configuration update.

In an implementation form of the first aspect, the configuration manager is configured to store information associated with a prevailing configuration associated with the plurality of elevator system nodes.

In an implementation form of the first aspect, the configuration manager is configured to compare the configuration update associated with the at least one elevator system node with the prevailing configuration, and determine the configuration data based on the comparison.

In an implementation form of the first aspect, the configuration manager is configured to receive a request for the prevailing configuration from the configuration entity, and transmit information associated with the prevailing configuration to the configuration entity.

In an implementation form of the first aspect, the elevator control unit comprises a router for connecting the elevator control unit to an external network, and the elevator control unit is configured to receive the configuration update from the external network.

In an implementation form of the first aspect, the configuration manager is configured to request data content from the external network, receive the data content from the external network, and transmit the data content to at least one elevator system node.

In an implementation form of the first aspect, the data content comprises at least one of a real-time data stream and image data.

In an implementation form of the first aspect, the configuration update is associated with at least one of: a new control pattern of elevator lights, audio data to be represented, image data to be displayed, video data to be displayed, elevator car behavior adjustment, and elevator car group behavior adjustment.

In an implementation form of the first aspect, the ethernet bus comprises a point-to-point ethernet bus.

In an implementation form of the first aspect, the ethernet bus comprises a multi-drop ethernet bus.

In an implementation form of the first aspect, the plurality of elevator system nodes comprises at least one of a sensor, a fixture, a display, a light controller, a door operator, an access gate, an elevator drive unit, and a call-giving device.

In an implementation form of the first aspect, the elevator control unit comprises an elevator controller.

In an implementation form of the first aspect, the elevator control unit comprises an elevator group controller.

According to a second aspect, there is provided an elevator system comprising a central elevator management system of the first aspect.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The following description illustrates a central elevator management system. The system comprises an ethernet bus, a plurality of elevator system nodes communicatively connected to the ethernet bus, and an elevator control unit communicatively connected to the ethernet bus and configured to communicate with the plurality of elevator system nodes via the ethernet bus. The elevator control unit is configured execute a configuration manager providing a management interface for a configuration entity, wherein the configuration manager is configured to receive a configuration update associated with at least one elevator system node from the configuration entity, and transmit configuration data to the at least one elevator system node based on the configuration update. The illustrated solution may enable, for example, a simple and efficient solution for configuring various elevator system nodes via a single configuration entity. The configuration entity may be an internal entity connected to the ethernet bus, or an external entity residing behind an external network, in particular an external internet protocol (IP) network, and being connected to the elevator control unit via a router.

In an example embodiment, the various embodiments discussed below may be used in an elevator system comprising an elevator that is suitable and may be used for transferring passengers between landing floors of a building in response to service requests. In another example embodiment, the various embodiments discussed below may be used in an elevator system comprising an elevator that is suitable and may be used for automated transferring of passengers between landings in response to service requests.

Figure 1A:
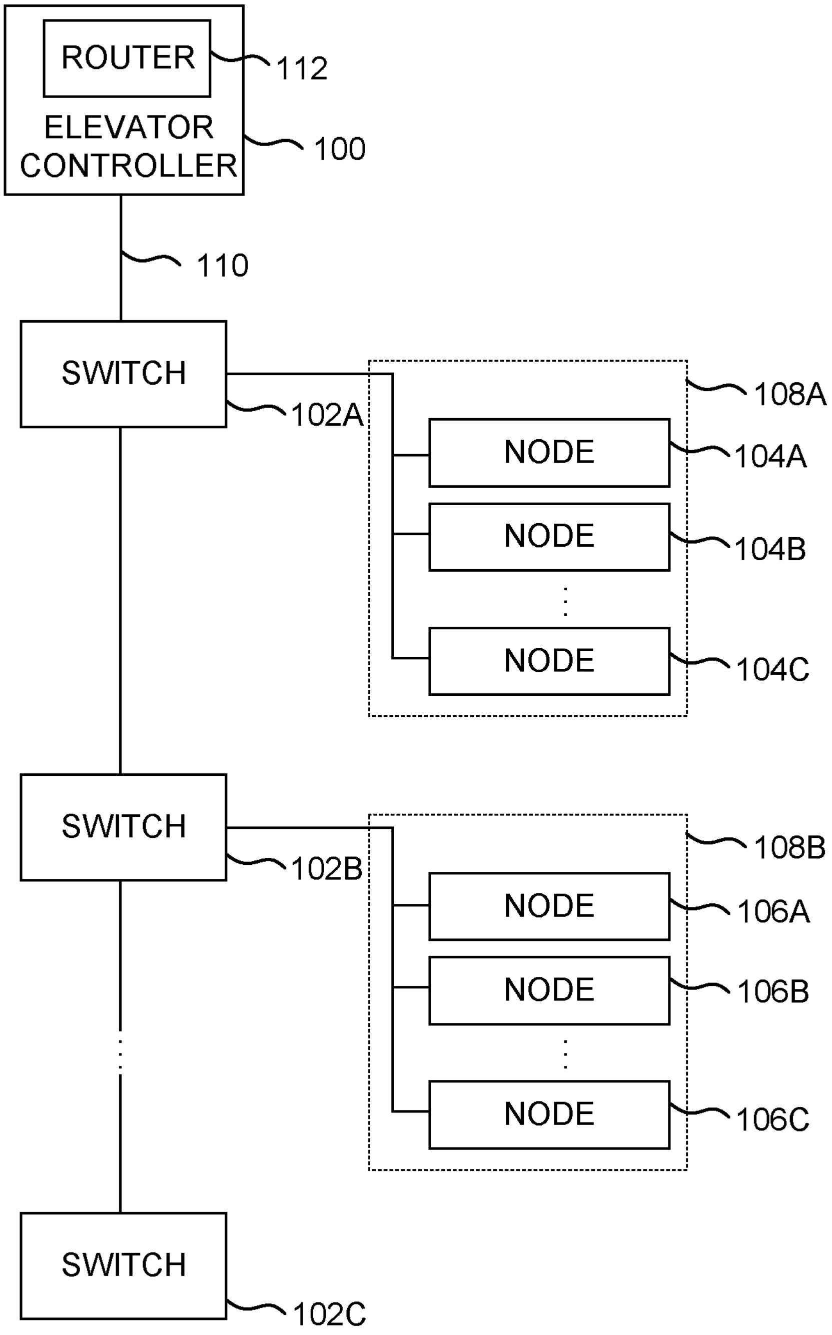
FIG. 1A illustrates an elevator communication system according to an example embodiment.

FIG. 1A illustrates a central elevator management system according to an example embodiment. The elevator communication system comprises an elevator control unit 100, for example, an elevator controller communicatively connected to an ethernet bus 110, for example, a point-to-point ethernet bus. The system may further comprise one or more multi-drop ethernet bus segments 108A, 108B (for example, in the form of 10BASE-T1S) reachable by the elevator controller 100, and a plurality of elevator system nodes 104A, 104B, 104C, 106A, 106B, 106C coupled to the multi-drop ethernet bus segments 108A, 108B and configured to communicate via the multi-drop ethernet bus 108A, 108B. The elevator controller 100 is reachable by the elevator system nodes 104A, 104B, 104C, 106A, 106B, 106C via the multi-drop ethernet bus segments 108A, 108B. Elevator system nodes that are coupled to the same multi-drop ethernet bus segment may be configured so that one elevator system node is to be active at a time while the other elevator system nodes of the same multi-drop ethernet bus segment are in a high-impedance state.

In an example embodiment, the elevator communication system may comprise at least one connecting unit 102A, 102B, 102C comprising a first port connected to the respective multi-drop ethernet bus segments 108A, 108B and a second port connected to the ethernet bus 110. Thus, by using the connecting units 102A, 102B, 102C, one or more multi-drop ethernet bus segments 108A, 108B may be connected to the ethernet bus 110. The connecting unit 102A, 102B, 102C may refer, for example, to a switch. The ethernet bus 110 may be, for example, 100BASE-TX or 10BASET1L point-to-point ethernet bus. The multi-drop ethernet bus segment 108A, 108B may comprise, for example, 10BASE-T1S multi-drop ethernet bus.

In an example embodiment, an elevator system node 104A, 104B, 104C, 106A, 106B, 106C may be configured to interface with at least one of an elevator fixture, an elevator sensor, an elevator safety device, an elevator control device, a fixture, a display, a light controller, a door operator, an access gate, an elevator drive unit, and a call-giving device etc. Further, in an example embodiment, power to the nodes may be provided with the same cabling. In another example embodiment, the elevator system nodes 104A, 104B, 104C, 106A, 106B, 106C may comprise shaft nodes, and a plurality of shaft node may form a shaft segment, for example, the multi-drop ethernet bus segment 108A, 108B.

In an example embodiment, the elevator controller 100 may comprise a router 112 for connecting the elevator controller 100 to an external network. Thus, elevator system nodes can be configured with a configuration entity outside the elevator communication system.

Figure 1B:
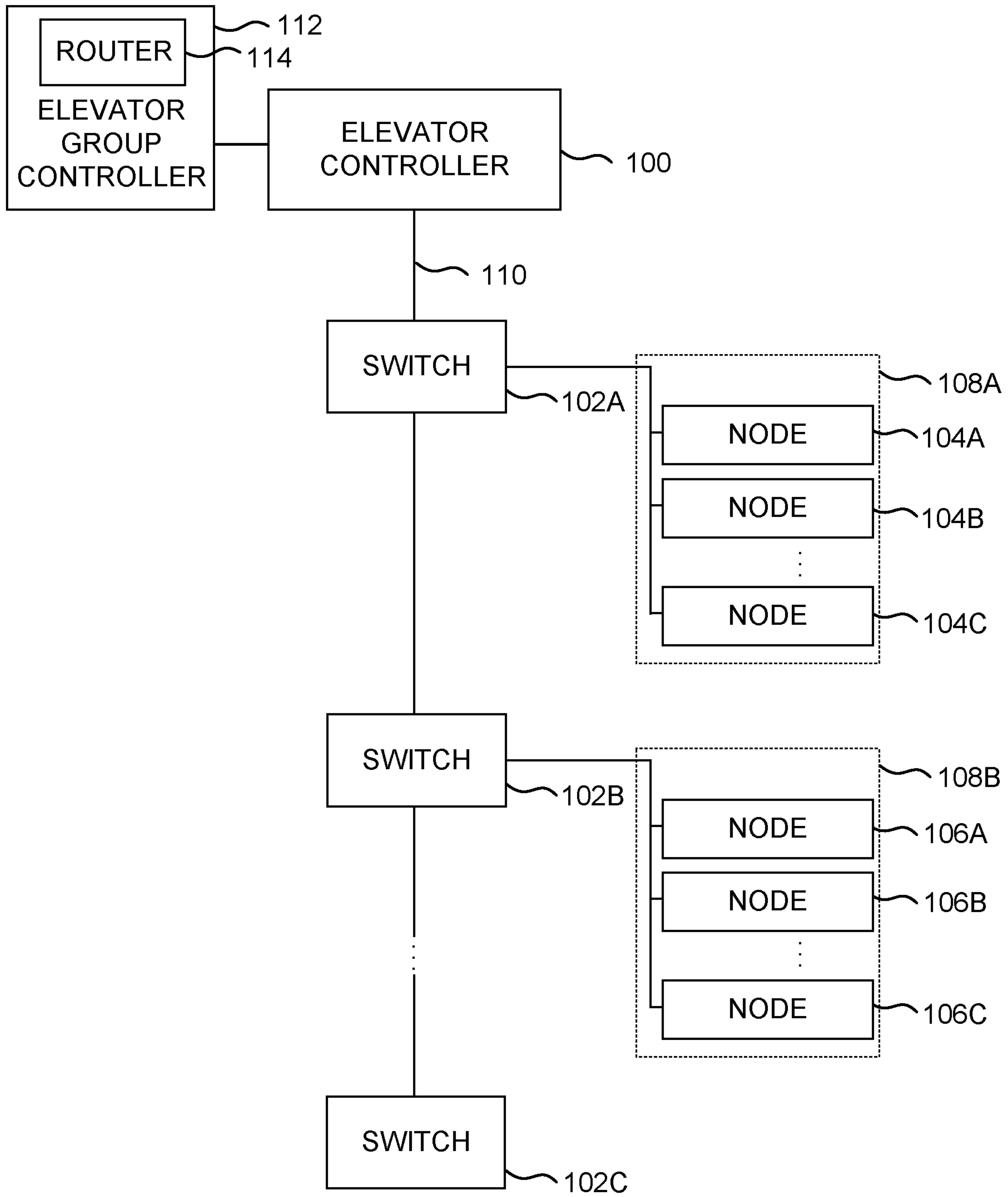
FIG. 1B illustrates an elevator communication system according to another example embodiment.

FIG. 1B illustrates a central elevator management system according to another example embodiment. The central elevator management system is identical with the system illustrated in FIG. 1A with the exception that the system further comprises an elevator group controller 112. The elevator group controller 112 may comprise a router 114 for connecting the elevator group controller 112 to an external network, in particular an IP network. Thus, elevator system nodes can be configured with a configuration entity outside the elevator communication system. The group controller 112 may be operable to allocate an elevator service request from elevator passengers to be served by different elevator cars based on certain allocation criteria, such as minimizing elevator waiting times, minimizing energy consumption of elevators etc.

Figure 1C:
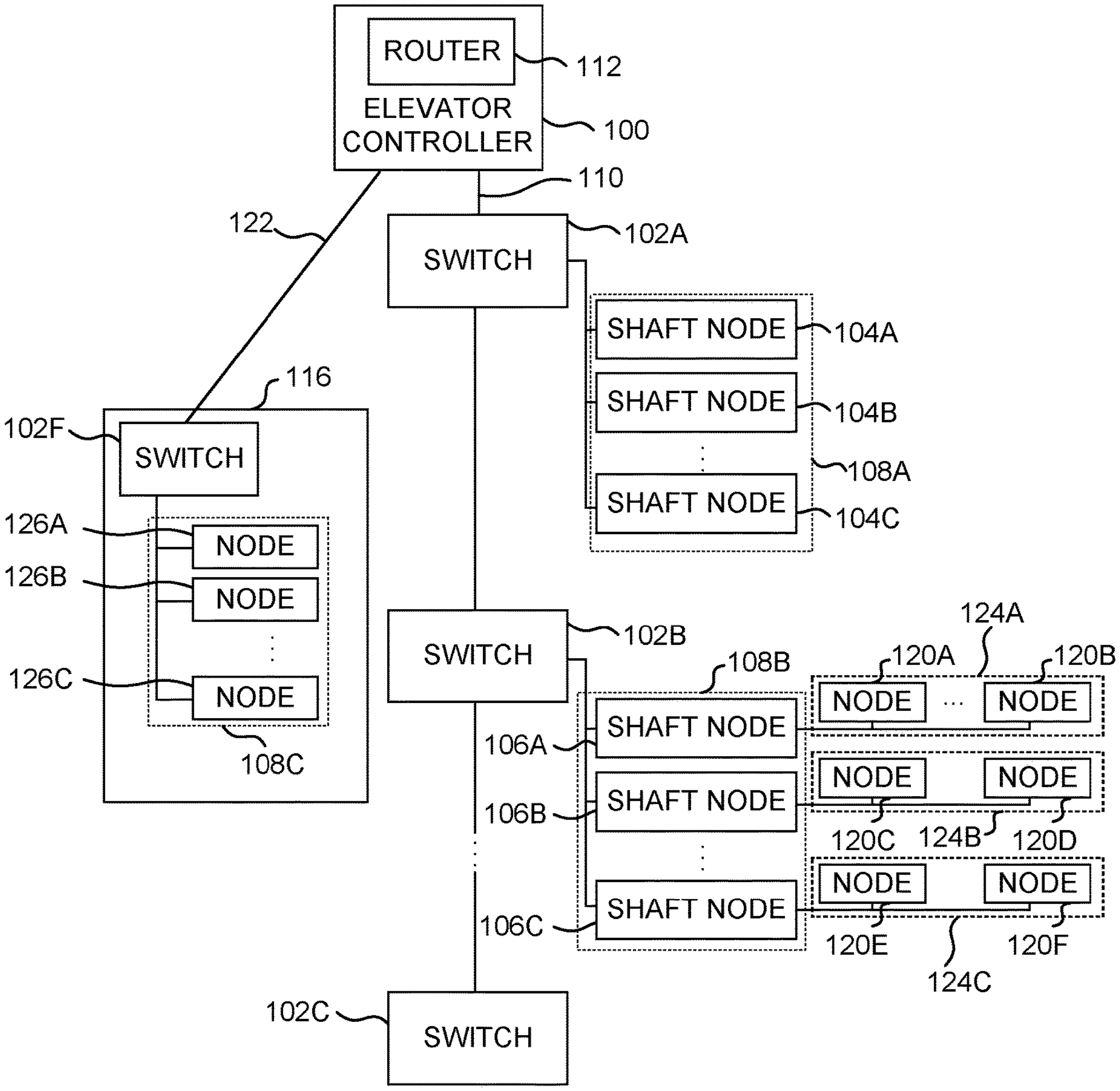
FIG. 1C illustrates an elevator communication system according to another example embodiment.

FIG. 1C illustrates a central elevator management system according to another example embodiment. The elevator communication system comprises an elevator control unit 100, for example, an elevator controller communicatively connected to an ethernet bus 110, for example, a point-to-point ethernet bus. The system may further comprise one or more multi-drop ethernet bus segments 108A, 108B, 108C, 124A, 124B, 124C reachable by the elevator controller 100, and a plurality of elevator system nodes 104A, 104B, 104C, 106A, 106B, 106C, 120A-120F, 126A-126C configured to communicate via the multi-drop ethernet bus segments 108A, 108B, 108C, 124A, 124B, 124C, wherein the elevator controller 100 is reachable by the elevator system nodes 104A, 104B, 104C, 106A, 106B, 106C, 120A-120F, 126A-126C via the multi-drop ethernet bus segments 108A, 108B, 108C, 124A, 124B, 124C.

In an example embodiment, the system may comprise at least one connecting unit 102A, 102B comprising a first port connected to the multi-drop ethernet bus segment 108A, 108B and a second port connected to the ethernet bus 110. Thus, by using the connecting units 102A, 102B one or more multi-drop ethernet bus segments 108A, 108B may be connected to the ethernet bus 110. The connecting unit 102A, 102B may refer, for example, to a switch, a hub or a router. The ethernet bus 110 may be, for example, 100BASE-TX or 10BASET1L point-to-point ethernet bus. The multi-drop ethernet bus segments 108A, 108B may comprise, for example, 10BASE-T1S multi-drop ethernet bus.

In an example embodiment, an elevator system node 120A-120F, 126A-126C may be configured to interface with at least one of an elevator fixture, an elevator sensor, an elevator safety device, an elevator control device, a fixture, a display, a light controller, a door operator, an access gate, an elevator drive unit, and a call-giving device etc. Further, in an example embodiment, power to the nodes may be provided with the same cabling.

The central management system may further comprise a point-to-point ethernet bus 122 that provides a connection to an elevator car 116 and to various elements associated with the elevator car 116. The elevator car 116 may comprise a connecting unit 102F, for example, a switch, to which one or more elevator car nodes 126A, 126B, 126C may be connected. In an example embodiment, the elevator car nodes 126A, 126B, 126C can be connected to the connecting unit 102F via a multi-drop ethernet bus segment 108C, thus constituting an elevator car segment. In an example embodiment, the point-to-point-ethernet bus 122 may be located in the travelling cable of the elevator car 116.

By implementing communication within the elevator communication system using at least one point-to-point ethernet bus and at least one multi-drop ethernet bus segment, various segments can be formed within the elevator communication system. For example, the elevator system nodes 120A, 120B may form a first landing segment 124A, the elevator system nodes 120C, 120D may form a second landing segment 124B, the elevator system nodes 120E, 120F may form a third landing segment 124C, the shaft nodes 104A, 104B, 104C may form a first shaft segment 108A, the shaft nodes 106A, 106B, 106C may form a second shaft segment 108B, and the elevator car nodes 126A, 126B, 126C may form an elevator car segment 108C. Each of the segments implemented using separate multi-drop ethernet buses.

As illustrated in FIG. 1C, the shaft nodes 106A, 106B, 106C may interconnect the shaft segment 108B to which the shaft nodes 106A, 106B, 106C are connected to and the landing segments 124A, 124B, 124C. In other words, the shaft nodes 106A, 106B, 106C may comprise or may act as a switch to the landing segments 124A, 124B, 124C. This may enable a simple solution for adding new elevator system nodes to the elevator communication system. This may also enable a solution in which a single elevator system node may act as a switch or a repeater to another multi-drop ethernet bus segment to which nearby elevator system elements, for example, a call button or buttons, a display or displays, a destination operating panel or panels, a camera or cameras, a voice intercom device etc.

Figure 1D:
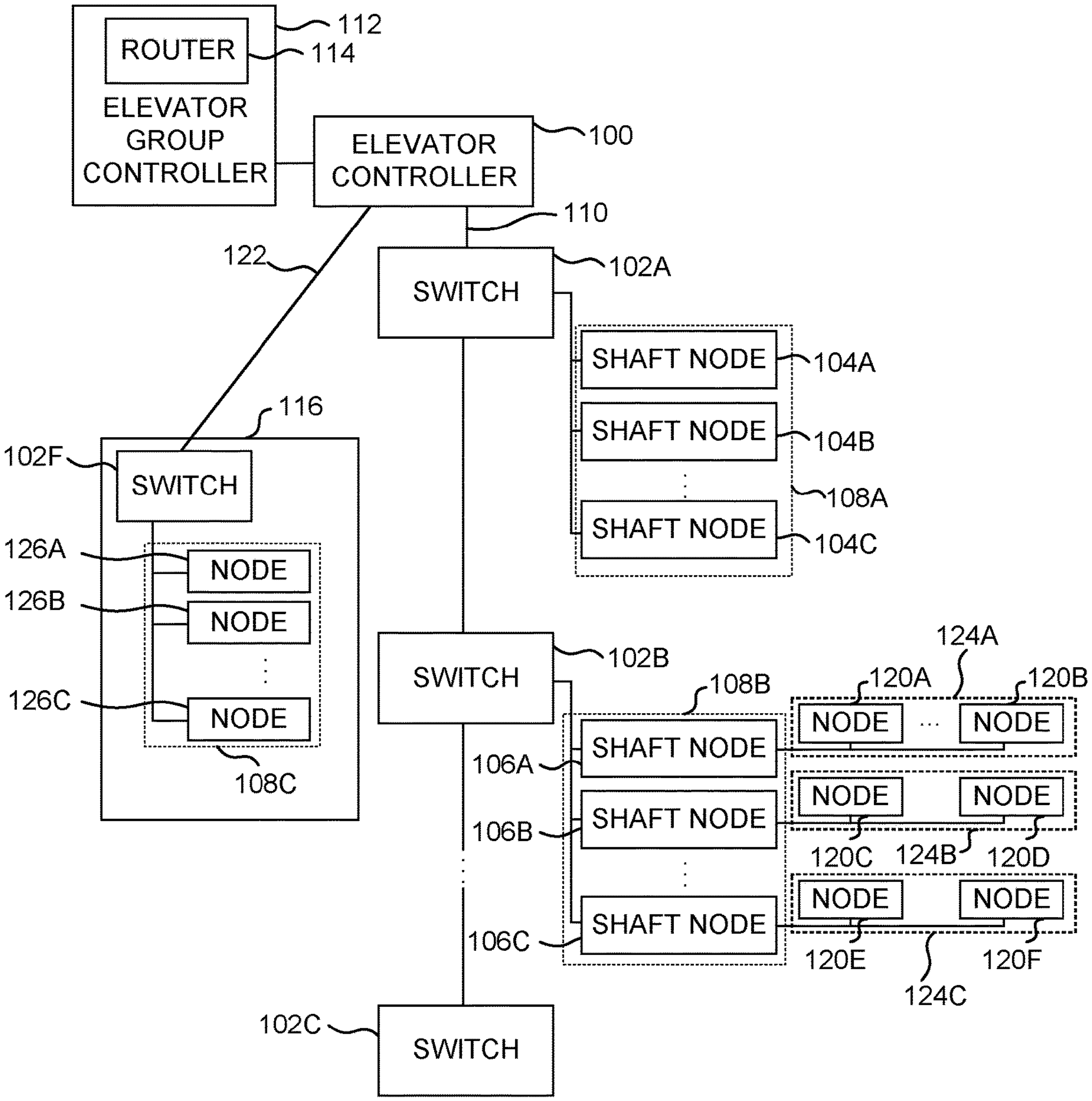
FIG. 1D illustrates an elevator communication system according to another example embodiment.

FIG. 1D illustrates a central elevator management system according to another example embodiment. The central elevator management system is identical with the system illustrated in FIG. 1C with the exception that the system further comprises an elevator group controller 112. The elevator group controller 112 may comprise a router 114 for connecting the elevator group controller 112 to an external network. Thus, elevator system nodes can be configured with a configuration entity outside the elevator communication system.

Figure 1E:
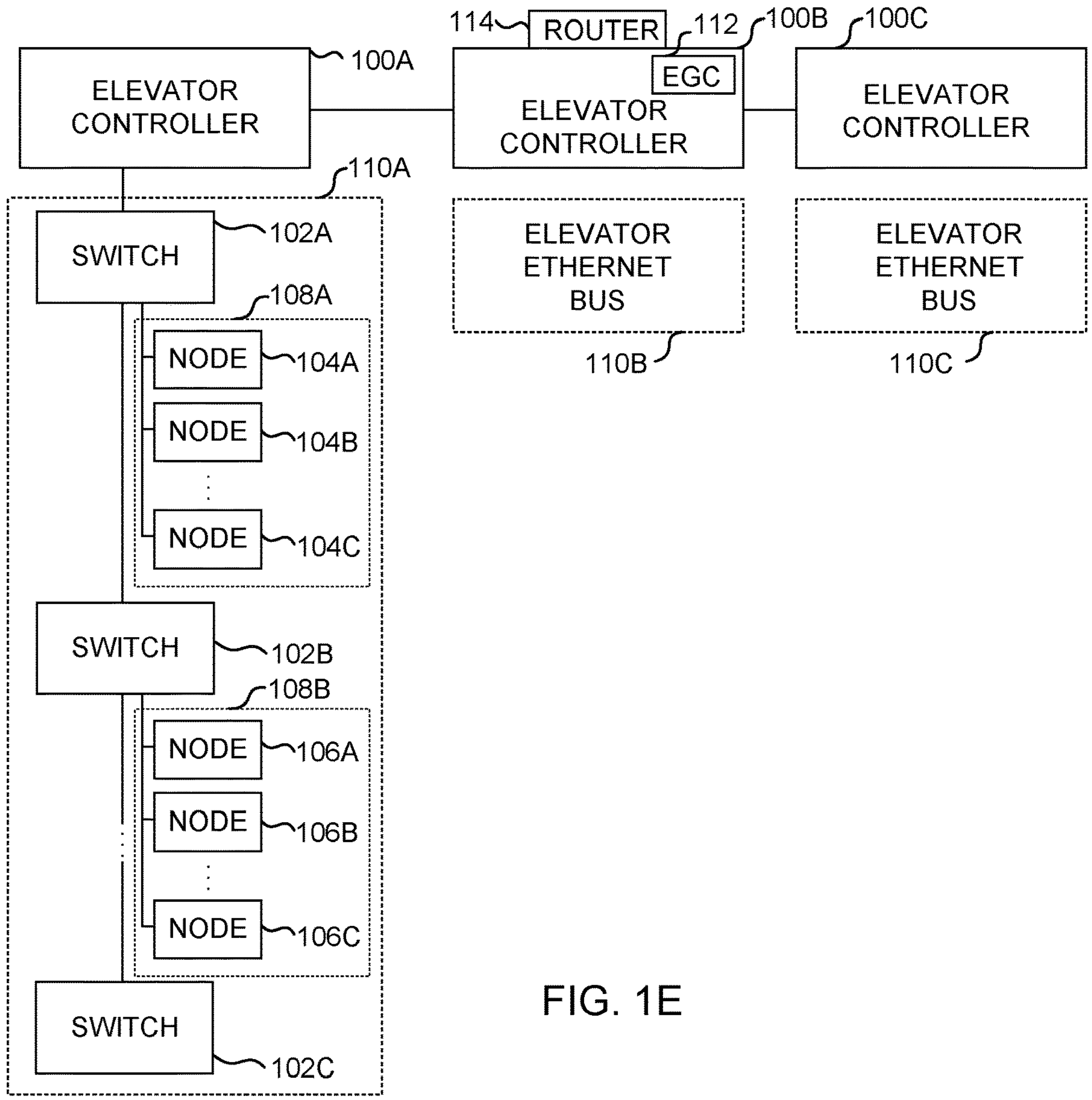
FIG. 1E illustrates an elevator communication system according to another example embodiment.

FIG. 1E illustrates an elevator communication system according to another example embodiment. An elevator group may have more than one (in this particular embodiment three) elevators, each having an elevator car and a drive system adapted to drive the elevator car through landing floors. Further, each elevator may have a separate elevator controller 100A, 100B, 100C to control operations of the respective elevator.

Elevator controllers 100A, 100B, 100C of different elevators may be communicatively connected to each other to share data. Different elevators of FIG. 1E may form an elevator group. One of the elevator controllers (in FIG. 1E the elevator controller 100B) is configured to act as an elevator group controller 112 for the elevator group. It may comprise group control software for allocating service requests from elevator passengers to the elevators of the elevator group based on some allocation criteria, such as minimizing elevator car waiting time, minimizing energy consumption, minimizing door to door time, implementing prioritizations, such as prioritized services for disabled persons etc.

Each elevator controller 100A, 100B, 100C is communicatively connected to an associated elevator ethernet bus 110A, 110B, 110C, for example, a point-to-point ethernet bus. The elevator ethernet buses 110B, 100C may comprise similar elevator system elements than that of the elevator ethernet bus 100A. The system may further comprise one or more multi-drop ethernet bus segments 108A, 108B (for example, in the form of 10BASE-T1S) reachable by the elevator controller 100A, and a plurality of elevator system nodes 104A, 104B, 104C, 106A, 106B, 106C coupled to the multi-drop ethernet bus segments 108A, 108B and configured to communicate via the multi-drop ethernet bus. The elevator controller 100A, 100B, 100C is reachable by the elevator system nodes 104A, 104B, 104C, 106A, 106B, 106C via the multi-drop ethernet bus segments 108A, 108B. Elevator system nodes that are coupled to the same multi-drop ethernet bus segment may be configured so that one elevator system node is to be active at a time while the other elevator system nodes of the same multi-drop ethernet bus segment are in a high-impedance state.

The elevator communication system may comprise at least one connecting unit 102A, 102B, 102C, e.g. a switch, to connect one or more multi-drop ethernet bus segments to the ethernet bus 110A. The ethernet bus 110A may be, for example, 100BASE-TX or 10BASET1L point-to-point ethernet bus. The multi-drop ethernet bus segment may comprise, for example, 10BASE-T1S multi-drop ethernet bus.

In an example embodiment, an elevator system node 104A, 104B, 104C, 106A, 106B, 106C may be configured to interface with at least one of an elevator fixture, an elevator sensor, an elevator safety device, an elevator control device, a fixture, a display, a light controller, a door operator, an access gate, an elevator drive unit, and a call-giving device etc. of the respective elevator. Accordingly, the elevator system nodes 104A, 104B, 104C, 106A, 106B, 106C may comprise shaft nodes, and a plurality of shaft node may form a shaft segment, for example, the multi-drop ethernet bus segment.

The elevator controller 100B may comprise a router 114 for connecting the elevator controller 100B to an external network, in particular an IP network. Thus, the elevator system nodes can be configured with a configuration entity outside the elevator communication system.

By means of the embodiment of FIG. 1E the group behavior of the elevator group may be centrally managed by means of the configuration entity, based on a configuration update received therefrom. This can mean that one or more allocation criteria of the elevator group may be changed or adjusted. For example, instead of minimizing door to door time, a more comfortable setup may be implemented by decreasing accelerations and/or travelling speeds the cars. Alternatively, or additionally, instead of minimizing elevator car waiting times, reduction of energy consumption of elevators may be implemented by adjusting the allocation strategies accordingly.

Figure 2:
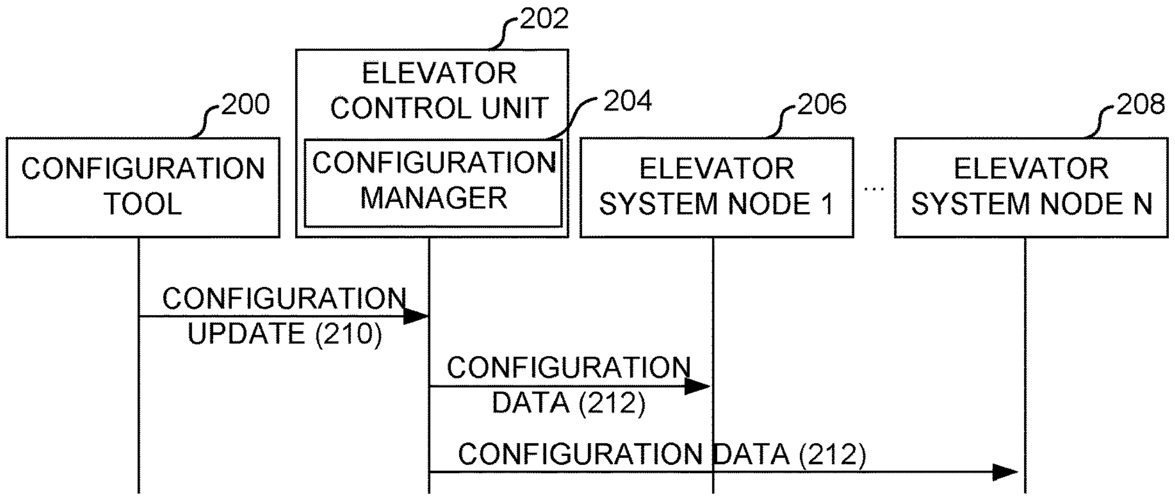
FIG. 2 illustrates a signaling diagram for a central elevator management system according to an example embodiment.

FIG. 2 illustrates a signaling diagram for a central elevator management system according to an example embodiment. The central management system may comprise one or more of the elements already discussed in FIGS. 1A-1E and their descriptions.

The elevator control unit 202, for example, the elevator controller 100 or the elevator group controller 112, may comprise a configuration manager 204 that is used for enabling a centralized management of elevator system nodes 206, 208. The configuration manager 204 may provide a management interface for a configuration entity, and the configuration manager 204 may be configured to receive a configuration update 210 associated with at least one elevator system node 206, 208 from a configuration entity 200. Generally speaking, the configuration entity 210 is an entity that enables centrally performed elevator system management from a single location, and it may be implemented as a software application executable in a device or a computer. The configuration entity 200 may be connected to the elevator control unit 202 or the configuration manager 204 locally, for example, via an internal ethernet bus illustrated in FIGS. 1A-1E, via Bluetooth etc. In another example embodiment, the configuration entity 200 may be disposed remotely and connected to the elevator control unit 202 or the configuration manager 204 via an external network, for example, the internet, from a service centre or a cloud-based service. In another example embodiment, the configuration entity 200 may even be an application executed in a mobile device connected to the elevator control 202 unit via a cellular network.

The configuration update may be associated with any elevator system node or parameter associated with the elevator system node that may be controlled by the configuration manager 204. The configuration update may be associated, for example, with at least one of a new control pattern of elevator lights, audio data to be represented, image data to be displayed, video data to be displayed, elevator car behavior adjustment, and elevator car group behavior adjustment etc. Thus, the actual elevator system node may comprise, for example, a sensor, a fixture, a display, a light controller, a door operator, an access gate, an elevator drive unit, a call-giving device etc.

Based on the configuration update 210, the configuration manager 204 is configured transmit configuration data 212 to at least one elevator system node 206, 208. For example, the configuration update 210 from the configuration entity 200 may be comprise one or more configuration requests with parameter data, and the configuration manager 204 then generates the actual control data needed for the elevator system nodes based on the configuration requests.

In an example embodiment, the configuration manager 204 may be configured to store information associated with a prevailing configuration associated with the plurality of elevator system nodes in a memory. In an example embodiment, the configuration manager 204 may need to compare the configuration update 210 associated with the at least one elevator system node 206, 208 with the prevailing configuration, and determine the configuration data 212 based on the comparison. For example, the configuration update 210 from the configuration entity 200 may comprise a request to "increase X by 5%". Thus, the configuration manager 204 may first need to determine from the memory what is the current configuration.

In another example embodiment, the configuration manager 204 may be configured to receive a request for the prevailing configuration from the configuration entity, and transmit information associated with the prevailing configuration stored in the memory to the configuration entity 200. This may happen, for example, when the configuration entity has not stored the currently prevailing configuration and it needs to check the configuration first from the configuration manager 204.

In an example embodiment, the configuration manager 204 may be configured to request data content from the external network, receive the data content from the external network, and transmit the data content to at least one elevator system node 206, 208. The data content may comprise, for example, at least one of audio data, image data, video data and real-time data stream. For example, the configuration manager 204 may request data to be displayed or played back by an elevator system node by itself or in response to a request from the configuration entity 200.

At least one of the above discussed embodiments enable a solution in which user experience associated with various elevator system nodes and elements may be modified by a single tool. This may also provide an efficient and a simple solution for overall management of the elevator system nodes. Further, different and node specific configuration entities are not needed as the ethernet based communication network of the elevator system enables an easy and centralized management.

Further, at least some of the above discussed example embodiments may enable transmission of any device data seamlessly between elevator system devices and any other device or system. Further, a common protocol stack may be used for all communication. At least some of the above discussed example embodiments may also enable a solution that provides high security and/or is easily expandable.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A central elevator management system, comprising:
- an ethernet bus;
- a plurality of elevator system nodes communicatively connected to the ethernet bus;
- an elevator control unit communicatively connected to the ethernet bus and configured to communicate with the plurality of elevator system nodes via the ethernet bus;
- wherein the elevator control unit is configured to execute a configuration manager providing a management interface for a configuration entity, wherein the configuration manager is configured to:
- receive a configuration update associated with the plurality of elevator system nodes from the configuration entity;
- store information associated with a prevailing configuration associated with the plurality of elevator system nodes;
- compare the configuration update associated with each of the plurality of elevator system nodes with the prevailing configuration;
- determine a configuration data for each of the plurality of elevator system nodes based on the comparison; and
- transmit each of the configuration data to a respective one of the plurality of elevator system nodes based on the configuration update.

2. The central elevator management system of claim 1, wherein the configuration manager is configured to:
- receive a request for the prevailing configuration from the configuration entity; and
- transmit information associated with the prevailing configuration to the configuration entity.

3. The central elevator management system of claim 1, wherein the elevator control unit comprises a router for connecting the elevator control unit to an external network, and the elevator control unit is configured to receive the configuration update from the external network.

4. The central elevator management system of claim 3, wherein the configuration manager is configured to:
- request data content from the external network;
- receive the data content from the external network; and
- transmit the data content to at least one elevator system node among the plurality of elevator system nodes.

5. The central elevator management system of claim 4, wherein the data content comprises at least one of a real-time data stream and image data.

6. The central elevator management system of claim 1, wherein the configuration update is associated with at least one of: a new control pattern of elevator lights, audio data to be represented, image data to be displayed, video data to be displayed, elevator car behavior adjustment, and elevator car group behavior adjustment.

7. The central elevator management system of claim 1, wherein the ethernet bus comprises a point-to-point ethernet bus.

8. The central elevator management system of claim 1, wherein the ethernet bus comprises a multi-drop ethernet bus.

9. The central elevator management system of claim 1, wherein the plurality of elevator system nodes comprises at least one of a sensor, a fixture, a display, a light controller, a door operator, an access gate, an elevator drive unit, and a call-giving device.

10. The central elevator management system of claim 1, wherein the elevator control unit comprises an elevator controller.

11. The central elevator management system of claim 1, wherein the elevator control unit comprises an elevator group controller.

12. The central elevator management system of claim 2, wherein the elevator control unit comprises a router for connecting the elevator control unit to an external network, and the elevator control unit is configured to receive the configuration update from the external network.

13. The central elevator management system of claim 2, wherein the configuration update is associated with at least one of: a new control pattern of elevator lights, audio data to be represented, image data to be displayed, video data to be displayed, elevator car behavior adjustment, and elevator car group behavior adjustment.

14. An elevator system comprising:
- a central elevator management system of claim 1.

* * * * *